United States Patent
Surendran (10) Patent No.: US 7,711,737 B2
(45) Date of Patent: May 4, 2010

(54) MULTI-DOCUMENT KEYPHRASE EXTRACTION USING PARTIAL MUTUAL INFORMATION

(75) Inventor: Arungunram C. Surendran, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 607 days.

(21) Appl. No.: 11/224,195

(22) Filed: Sep. 12, 2005

(65) Prior Publication Data

US 2007/0061320 A1    Mar. 15, 2007

(51) Int. Cl.
G06F 17/30    (2006.01)

(52) U.S. Cl. ............... 707/748; 707/749; 707/750; 715/254

(58) Field of Classification Search .............. None
See application file for complete search history.

(56) References Cited

U.S. PATENT DOCUMENTS

| | | | | |
|---|---|---|---|---|
| 5,418,717 A * | 5/1995 | Su et al. | ............ | 704/9 |
| 5,717,914 A * | 2/1998 | Husick et al. | ............ | 707/5 |
| 5,745,602 A * | 4/1998 | Chen et al. | ............ | 382/229 |
| 5,936,972 A * | 8/1999 | Meidan et al. | ............ | 714/712 |
| 6,128,613 A * | 10/2000 | Wong et al. | ............ | 707/7 |
| 6,239,740 B1 * | 5/2001 | Collins et al. | ............ | 342/109 |
| 6,446,061 B1 * | 9/2002 | Doerre et al. | ............ | 707/3 |
| 6,587,586 B1 * | 7/2003 | Cui et al. | ............ | 382/176 |
| 6,665,661 B1 * | 12/2003 | Crow et al. | ............ | 707/5 |
| 6,823,333 B2 * | 11/2004 | McGreevy | ............ | 707/4 |
| 7,139,754 B2 * | 11/2006 | Goutte et al. | ............ | 707/4 |
| 2002/0191205 A1 * | 12/2002 | Stringham | ............ | 358/1.13 |
| 2003/0144994 A1 * | 7/2003 | Wen et al. | ............ | 707/3 |
| 2003/0169441 A1 * | 9/2003 | Garcia et al. | ............ | 358/1.9 |
| 2003/0208485 A1 * | 11/2003 | Castellanos | ............ | 707/5 |
| 2004/0117725 A1 * | 6/2004 | Chen et al. | ............ | 715/500 |
| 2004/0181525 A1 | 9/2004 | Itzhak et al. | | |
| 2004/0249810 A1 * | 12/2004 | Das et al. | ............ | 707/5 |
| 2004/0260543 A1 * | 12/2004 | Horowitz et al. | ............ | 704/221 |
| 2005/0065909 A1 * | 3/2005 | Musgrove et al. | ............ | 707/2 |
| 2005/0080780 A1 * | 4/2005 | Colledge et al. | ............ | 707/4 |
| 2005/0091050 A1 * | 4/2005 | Surendran et al. | ............ | 704/226 |
| 2005/0091321 A1 * | 4/2005 | Daniell et al. | ............ | 709/206 |

(Continued)

OTHER PUBLICATIONS de Vries et al., "Relevance Information: A Loss of Entropy but a Gain for IDF?", Aug. 15, 2005, SIGIR'05, ACM Press, p. 282-289.*

(Continued)

*Primary Examiner*—Khanh B Pham
(74) *Attorney, Agent, or Firm*—Lee & Hayes, PLLC (57) ABSTRACT

A keyphrase extraction system and method are provided. The system and method can be employed to create an automatic summary of a subset of document(s). The system can automatically extract a list of keyword(s) that can operate on multiple documents, and across many different domains. The system is unsupervised and requires no prior learning.

A term identifier identifies candidate terms (e.g., words and/or phrases) in the document subset which are used to form a document-term matrix. A probability computation component calculates probability values of: (1) the joint probability of a word (e.g., term) and a document, (2) the marginal probability of the word (e.g., term), and (3) the marginal probability of the document. Based on the probability values, a partial mutual information metric can be calculated for each candidate term. Based on the partial mutual information metric, one or more of the terms can be identified as summary keyphrases.

14 Claims, 8 Drawing Sheets

U.S. PATENT DOCUMENTS

| | | | | |
|---|---|---|---|---|
| 2005/0228657 | A1* | 10/2005 | Chou et al. | 704/225 |
| 2005/0228783 | A1* | 10/2005 | Shanahan et al. | 707/3 |
| 2006/0123000 | A1* | 6/2006 | Baxter et al. | 707/5 |
| 2006/0136589 | A1* | 6/2006 | Konig et al. | 709/224 |
| 2006/0222172 | A1* | 10/2006 | Chhetri et al. | 379/406.05 |
| 2007/0005340 | A1* | 1/2007 | Goutte et al. | 704/9 |
| 2007/0061320 | A1* | 3/2007 | Surendran | 707/5 |

OTHER PUBLICATIONS

Yamamoto et al., "Using Suffix Arrays to Computer Term Frequency and Document Frequency for All Substrings in a Corpus", Mar. 2001, Computational Linguistics, ACM Press, p. 1-30. (Retrieved from ACM Digital Library Dec. 14, 2007).*

Monz et al., "Iterative Translation Disambiguation for Cross-Language Retrieval", Aug. 15, 2005, SIGIR'05, ACM Press, p. 520-527.*

Spärck Jones, "A statistical interpretation of term specificity and its application in retrieval", Journal of Document, 2004, vol. 60, No. 5, University Press, (Reprinted from Journal of Documentation, 1972, vol. 28. No. 1), p. 493-501.*

Kleinberg, "Authoritative Sources in a Hyperlinked Environment", 1999, Journal of the ACM, vol. 46 No. 5, p. 1-34.*

Amento et al, "Does Authority Mean Quality? Predicting Expert Quality Ratings of Web Documents", Jul. 2000, ACM SIGIR 2000, p. 296-303.*

Bharat et al, "Improved Algorithms for Topic Distillation in a Hyperlinked Environment", Aug. 1998, Proceedings of SIGIR 1998, ACM Press, p. 104-111. <Retrieved from ACM Portal on Dec. 20, 2008>.*

Kraaij et al, "The Importance of Prior Probabilities for Entry Page Search", Aug. 2002, Proceedings of SIGIR 2002, ACM Press, p. 27-34. <Retrieved from ACM Portal Dec. 20, 2008>.*

Ian H. Witten, et al., KEA: Practical Automatic Keyphrase Extraction, ACM DL, 1999.

Hongyuan Zha, Generic Summarization and Keyphrase Extraction Using Mutual Reinforcement Principle and Sentence Clustering, SIGIR '02, Aug. 11-15, 2002, pp. 113-120, Tampere, Finland.

* cited by examiner

MULTI-DOCUMENT KEYPHRASE EXTRACTION USING PARTIAL MUTUAL INFORMATION

BACKGROUND

Search or information retrieval systems are common tools enabling users to find desired information relating to a topic. Search engines or other search systems are often employed to enable users to direct user-crafted queries in order to find desired information. Unfortunately, this often leads to frustration when many unrelated files are retrieved since users may be unsure of how to author or craft a particular query, or because queries may be ambiguous. This often causes users to continually modify queries in order to refine retrieved search results to a reasonable number of files.

As an example of this dilemma, it is not uncommon to type in a word or phrase in a search system input query field and retrieve several thousand files—or millions of web sites in the case of the Internet, as potential candidates. In order to make sense of the large volume of retrieved candidates, the user will often experiment with other word combinations to further narrow the list since many of the retrieved results may share common elements, terms or phrases yet have little or no contextual similarity in subject matter. This approach is inaccurate and time consuming for both the user and the system performing the search. Inaccuracy is illustrated in the retrieval of thousands if not millions of unrelated files/sites the user is not interested in. Time and system processing are also sacrificed when searching massive databases for possible yet unrelated files.

It is important to ensure that the documents displayed to a user be ordered according to relevance, with the most relevant displayed first. In some applications involving search over large collections of documents, such as search within a company's corporate domain, human editors review the most common search terms and select documents that should be displayed in future in response to those query terms (e.g., using keyphrases). For example, the human editors might select solutions to common problems experienced by users. As can be appreciated, manual processing over hundreds or thousand of terms can be time consuming and inefficient.

A user's understanding of a collection of documents can be greatly enhanced by a summary of the contents of subsets of the collection. The collection of documents can include, for example, word processing documents, emails and/or web pages. The summary can identify the contents of subsets the collection with one or more keyphrases.

Conventional methods for generating lists of keywords from documents have operated on a single document at a time. Further, conventional methods have been trained on specific domains and hence do not translate well to different domains.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A keyphrase extraction system and method are provided. The system and method can be employed to create an automatic summary of a subset of document(s) (e.g., document collection). For example, the summary can provide a compact representation of the subset of document(s) as part of a graphical user interface (GUI) in which several documents can be shown as a list of keyword(s) (e.g., label subset of documents). The system can be a component of a document collection management system. The system can automatically extract a list of keyword(s) that can operate on multiple documents, and across many different domains. The system is unsupervised and requires no prior learning.

The system includes a term identifier, a probability computation component, a partial mutual information computation component and a summarization component. The system receives digital representation of a subset of document(s) as an input. The subset of documents can be selected, for example, by a human and/or by an automatic clustering algorithm. The subset can be improper, that is, it can be the whole set (e.g., no selection at all). The term identifier identifies candidate terms (e.g., words and/or phrases) in the document subset. The term identifier can find candidate terms that occur at least once in the document (e.g., using a noun phrase detector and/or phrase detection technique(s)).

The probability computation component calculates probability values of (1) the joint probability of a word (e.g., term) and a document, (2) the marginal probability of the word (e.g., term), and (3) the marginal probability of the document. Further, optionally, the probability computation component can smooth and/or appropriately weight versions of one or more of the values.

The partial mutual information metric computation component computes a partial mutual information metric for the terms (e.g., for each term) based on the probability values. In general, for each word that occurs in the set S, the following is computed: (sum over all documents in selected set) joint probability of finding the word and document together x log (a ratio between two numbers). The ratio is between (1) the joint probability of the word and the document and (2) the product of the marginal probability of the word and the marginal probability of the document. For example, the partial mutual information metric computer component can compute the partial mutual information metric for each term, by summing a formula over the documents in the set S.

Finally, the summarization component identifies one or more of the terms to be summary keyphrases of the subset S based, at least in part, upon the partial mutual information metrics. For example, the top K terms (e.g., for some K chosen by a user) can become the summary keyphrases. Additionally, if a keyphrase in the top K has a word that is also in the top K, it may be optionally dropped and the $K+1^{th}$ term may be used. Also, K may be chosen so that all terms with partial mutual information that is some fraction of the largest are shown (e.g., 0.5 of the largest).

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored on computer readable media including an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Figure 1:
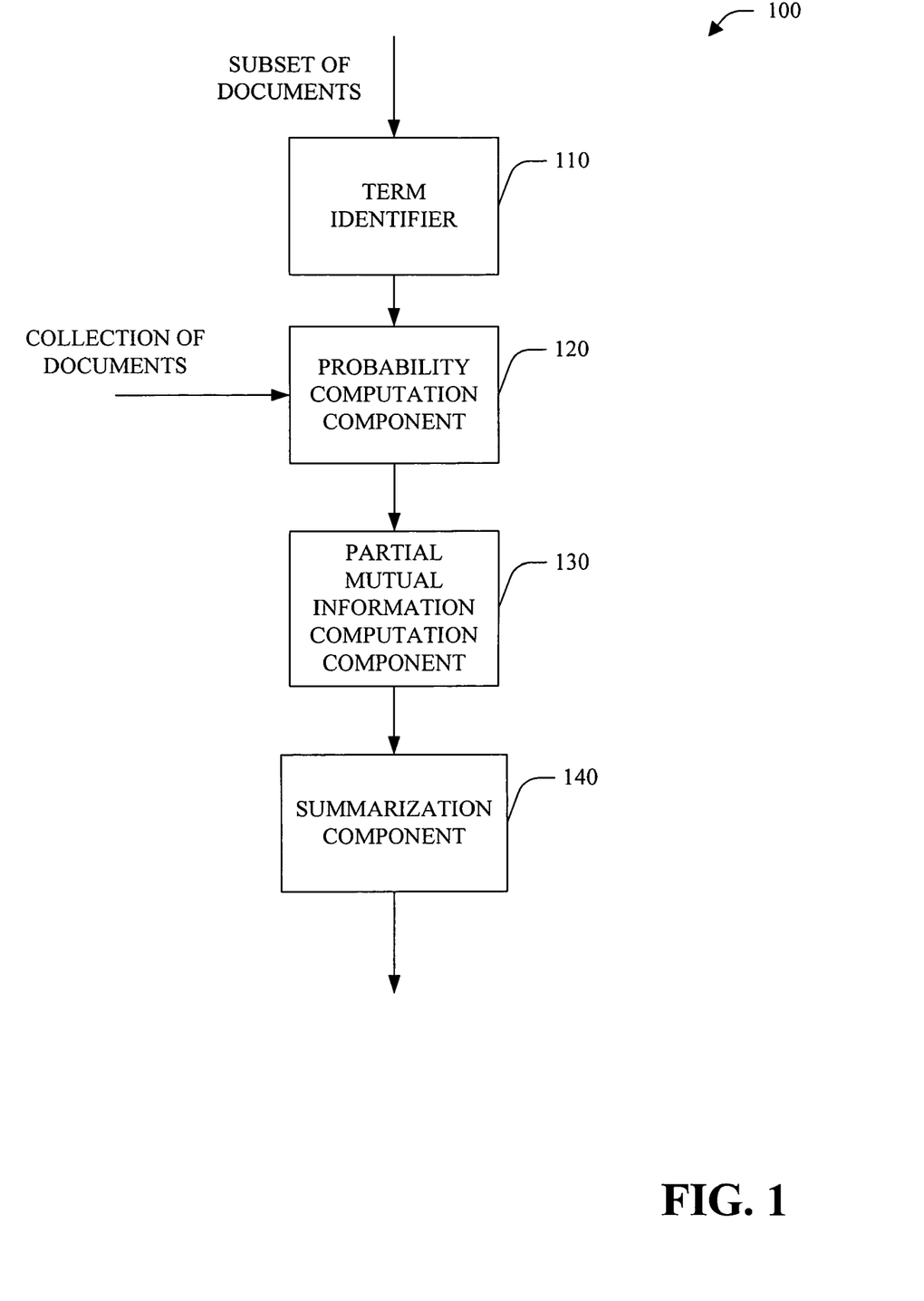
FIG. 1 is a block diagram of a keyphrase extraction system.

Referring to FIG. 1, a keyphrase extraction system 100 is illustrated. The system 100 can be a component of a document collection management system, as discussed below. The system 100 can be employed to create an automatic summary of a subset of document(s) (e.g., document collection). For example, the summary can provide a compact representation of the subset of document(s) as part of a graphical user interface (GUI) in which several documents can be shown as a list of keyword(s) (e.g., label subset of documents).

Conventional systems generally have been trained on specific domains and do not translate well to different domains. The system 100 can automatically extract a list of keyword(s) that can operate on multiple documents, and across many different domains. The system 100 is unsupervised and requires no prior learning. The system 100 can label (e.g., with a few words) the contents of a document set within a collection of documents. For example, the system 100 can be employed to identify web pages, file directories, e-mails etc. The system 100 includes a term identifier 110, a probability computation component 120, a partial mutual information computation component 130 and a summarization component 140, as discussed below.

The system 100 receives digital representation of a subset of document(s) as an input. The subset of documents can be selected, for example, by a human and/or by an automatic clustering algorithm. The subset can be improper, that is, it can be the whole set (e.g., no selection at all). The subset of document(s) is designated S. Optionally, the system 100 can additionally receive the document collection as an input.

The term identifier 110 identifies candidate terms (e.g., words and/or phrases) in the document subset S. The term identifier 100 can find candidate terms that occur at least once in the document. For example, phrases can be detected by a noun phrase detector, as is known in the art. Additionally and/or alternatively, phrases can be identified as a string of one or more words between any two stop words, again using phrase detection techniques. Once a list of candidate terms (e.g., words and phrases) is identified, occurrences, if any, of stop words can be removed from the list. Also, a frequency count can be used to eliminate words and/or phrases that occur very rarely (e.g., below a particular threshold) in the subset S.

The probability computation component 120 calculates three probability values: (1) the joint probability of a word (e.g., term) and a document, (2) the marginal probability of the word (e.g., term), and (3) the marginal probability of the document. Further, optionally, the probability computation component 120 can smooth and/or appropriately weight versions of one or more of the values.

Those skilled in the art will recognize that there are a variety of methods for calculating these probabilities. For example, these probabilities can be computed from marginal counts using straightforward ratios, Bayesian method, etc. All such methods are intended to be encompassed by the hereto appended claims.

Figure 2:
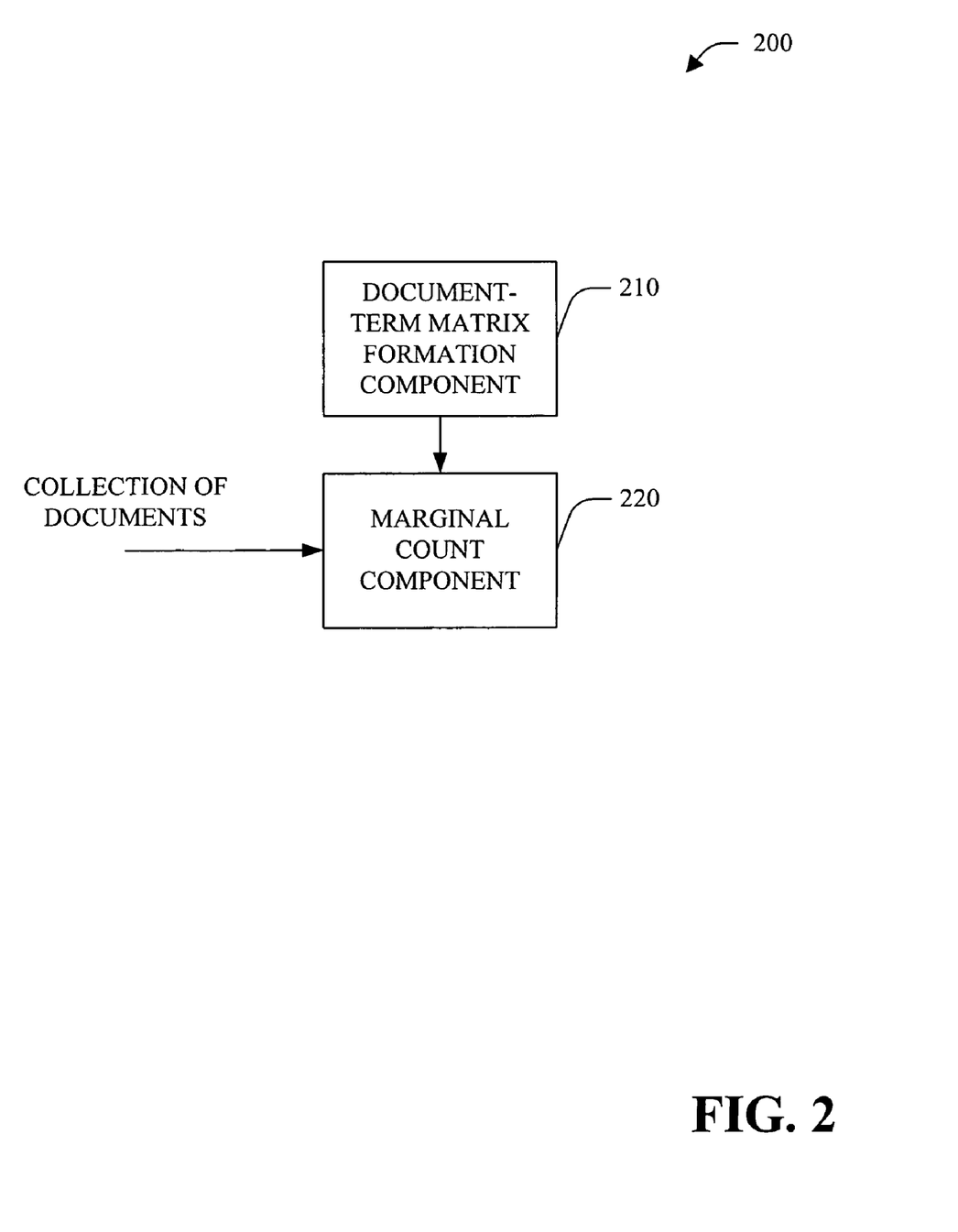
FIG. 2 is a block diagram of a probability computation component.

Referring briefly to FIG. 2, an exemplary probability computation component 120 is illustrated. In this example, the probability computation component 120 includes a document-term matrix formation component 210 and a marginal count component 220.

The document-term matrix formation component 210 forms a document-term matrix based on the identified candidate terms and the document subset. In one example, row(s) of the matrix correspond to terms, and column(s) of the matrix correspond to documents. An element of this matrix is the number of times the term i appears in document j (e.g., $n_{i,j}$). For example:

TABLE 1

|  | Document$_1$ | Document$_2$ | ... | Document$_M$ |
|---|---|---|---|---|
| Term$_1$ | 0 | 5 |  | 2 |
| Term$_2$ | 12 | 18 |  | 3 |
| ... |  |  |  |  |
| Term$_N$ | 0 | 0 |  | 8 |

Optionally, the matrix can be stored in a sparse matrix data structure.

The marginal count component 220 computes marginal counts. For example, for each candidate term, the marginal count component 220 can compute the number of times the particular candidate term occurs (e.g., in the entire document collection):

$$n_i = \sum_j n_{i,j} \quad (1)$$

The marginal count component 220 can further compute the number of terms (m) per document (e.g., for each document in the entire document collection):

$$m_j = \sum_i n_{i,j} \quad (2)$$

The marginal count component 220 can additionally compute the total number of terms in the document collection (N):

$$N = \sum_{i,j} n_{i,j} \quad (3)$$

Optionally, these marginal counts can be computed simultaneously with forming the document-term matrix. Additionally, using inverse document frequency, terms that appear in substantially all documents can, optionally, be given reduced weight and/or ignored for purposes of keyphrase extraction (e.g., copyright notice appearing on articles, v-card include with email communications etc.).

Further, optionally, the marginal count component 220 can smooth and/or appropriately weight versions of one or more of the counts. For example, situations can arise in which one or more of the actual counts is unreliable and needs to be appropriately biased (e.g., when the documents are too short). The probabilities can be computed from the marginal counts using straightforward ratios, Bayesian method, etc.

Returning to FIG. 1, the partial mutual information metric computation component 130 computes a partial mutual information metric for the terms (e.g., for each term) based on the probability values calculated by the probability computation component 120 (e.g., the marginal counts and the document-term matrix). More specifically, partial mutual information is computed only for words that occur in the chosen set S. In general, for each word that occurs in the set S, the following is computed: (sum over all documents in selected set) joint probability of finding the word and document together x log (a ratio between two numbers). The ratio is between (1) the joint probability of the word and the document and (2) the product of the marginal probability of the word and the marginal probability of the document.

Those skilled in the art will recognize that there are many methods to reliably measure the joint and the marginal probabilities and all such methods are intended to fall within the scope of the hereto appended claims. For example, the partial mutual information metric computation component 130 can employ actual, smooth and/or weighted versions of one or more of the counts discussed above. Optionally, the partial mutual information metric computation component 130 can employ smoothing and/or appropriately weighting when computing the partial mutual information metrics.

Continuing with the example of FIG. 2, the partial mutual information metric computation component 130 can compute the partial mutual information metric for each term, by summing a formula over the documents in the set S and/or the documents in the document collection. In one example, the values of the document-term matrix are only accessed for documents in the subset S. Therefore, as an optimization, the document-term matrix formation component 210 need only maintain the document-term matrix for documents in the subset S, while the marginal counts of the marginal count component 220 are over all documents in the document collection.

For example, the partial mutual information metric can be based on the following equation:

$$I_i = \sum_{j \in S} \frac{n_{i,j}}{N} \log \frac{n_{i,j}/n_i}{m_j/N} \quad (4)$$

As discussed with respect to the marginal count component 220, optionally, one or more of the counts can be smoothed and/or appropriately weighted. The partial mutual information metric computation component 130 can, optionally, employ smoothing and/or appropriately weighting when computing the partial mutual information metrics.

Finally, the summarization component 140 identifies one or more of the terms to be summary keyphrases of the subset S based, at least in part, upon the partial mutual information metrics. For example, the top K terms (e.g., for some K chosen by a user) can become the summary keyphrases. Additionally, if a keyphrase in the top K has a word that is also in the top K, it may be optionally dropped and the K+1$^{th}$ term may be used. Also, K may be chosen so that all terms with partial mutual information that is some fraction of the largest are shown (e.g., 0.5 of the largest).

Figure 3:
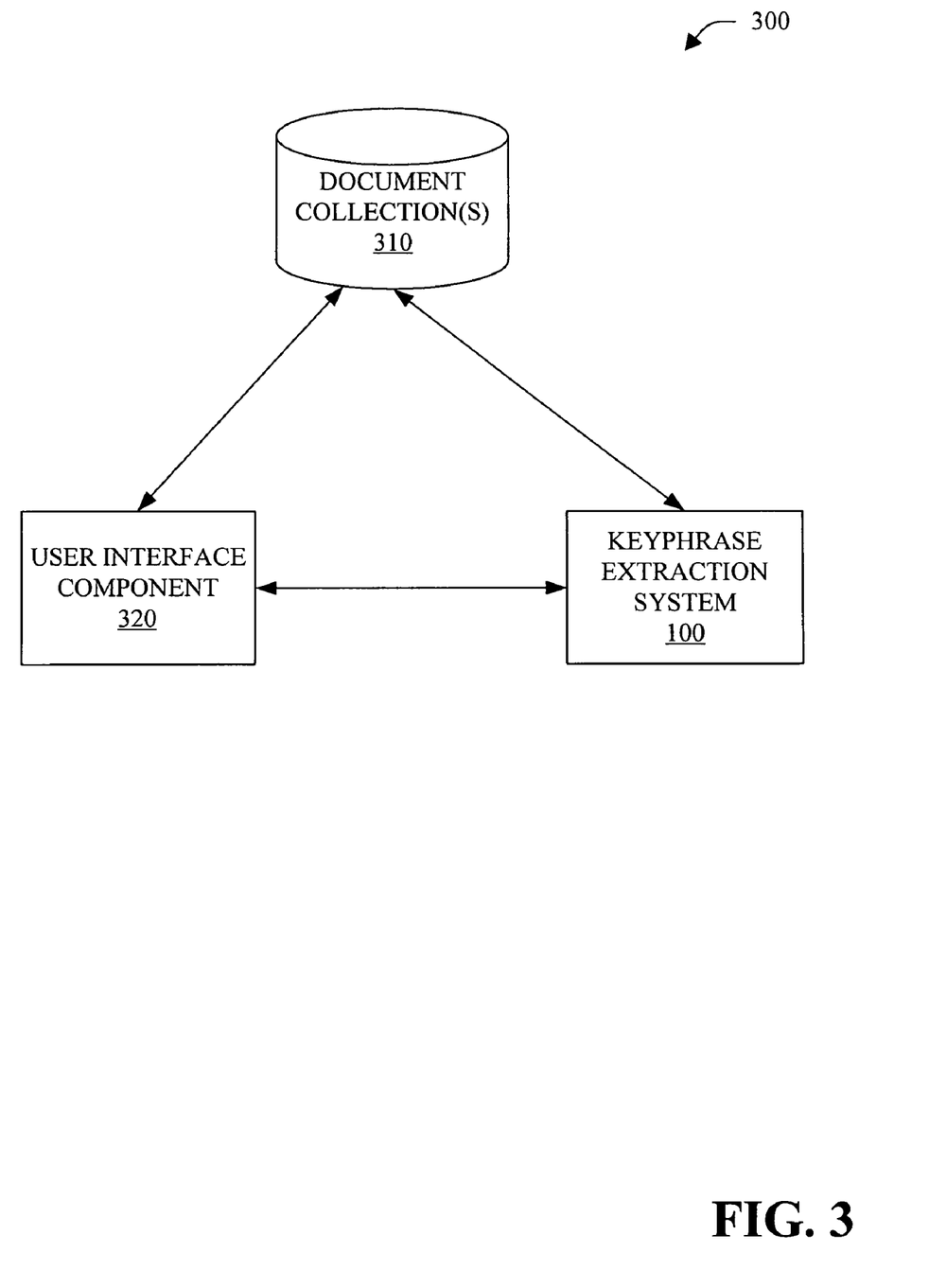
FIG. 3 is a block diagram of a document collection management system.

Next, turning to FIG. 3, a document collection management system 300 is illustrated. The system 300 includes a keyphrase extraction system 100, document collection(s) 310 and a user interface component 320. The user interface component 320 can communicate information to the keyphrase system 100, for example, identification of subset(s) of the document collection(s) and/or threshold setting(s). The user interface component 320 can further receive information from the keyphrase system 100, for example, the summary keyphrases produced by the system 100. The user interface component 320 can further communicate with the document collection(s), for example, based upon the summary keyphrases produced by the system 100.

Figure 4:
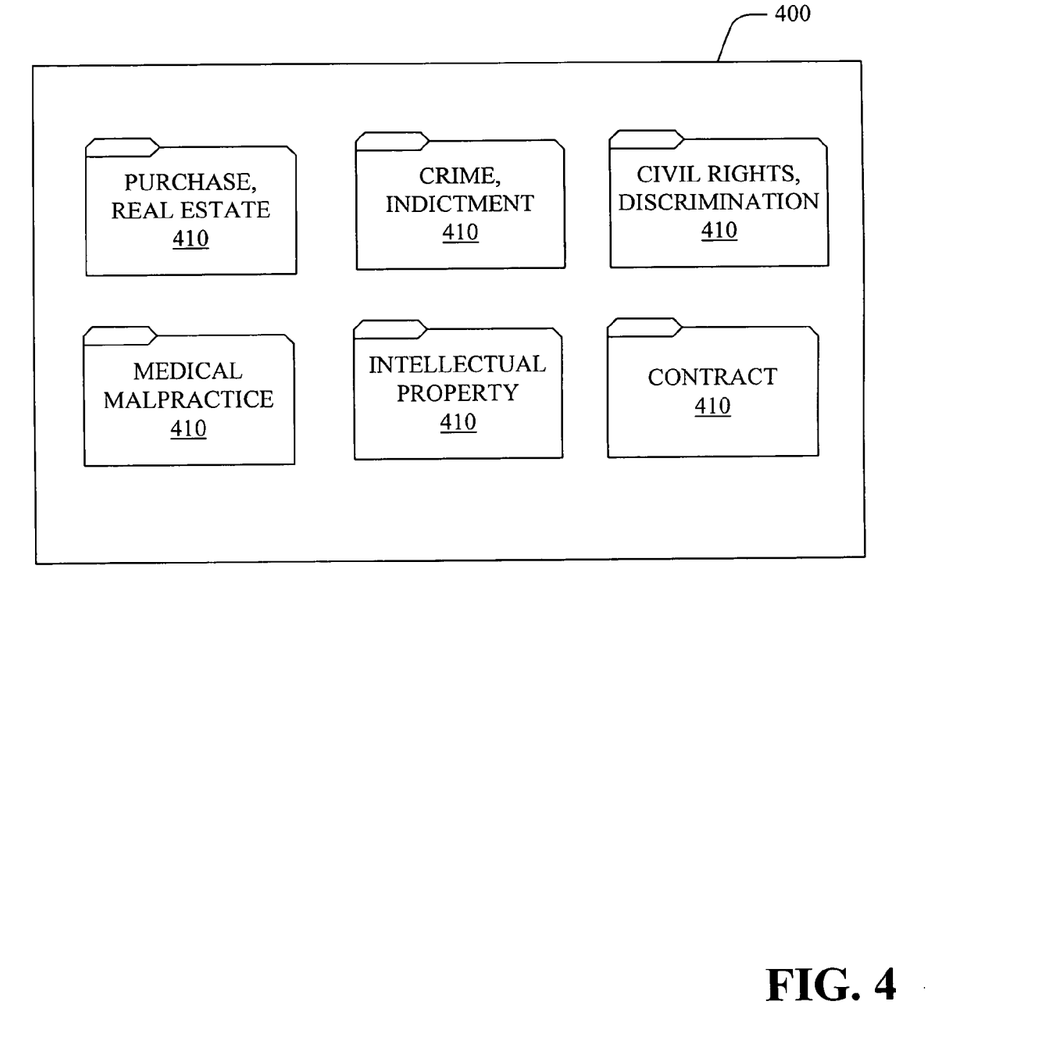
FIG. 4 is an exemplary user interface.

For example, referring to FIG. 4, an exemplary user interface 400 is illustrated. In this example, the keyphrase extraction system 100 was employed to automatically summarize a collection of legal articles. The keyphrases extracted by the system 100 were employed to label file folders 410.

Figure 5:
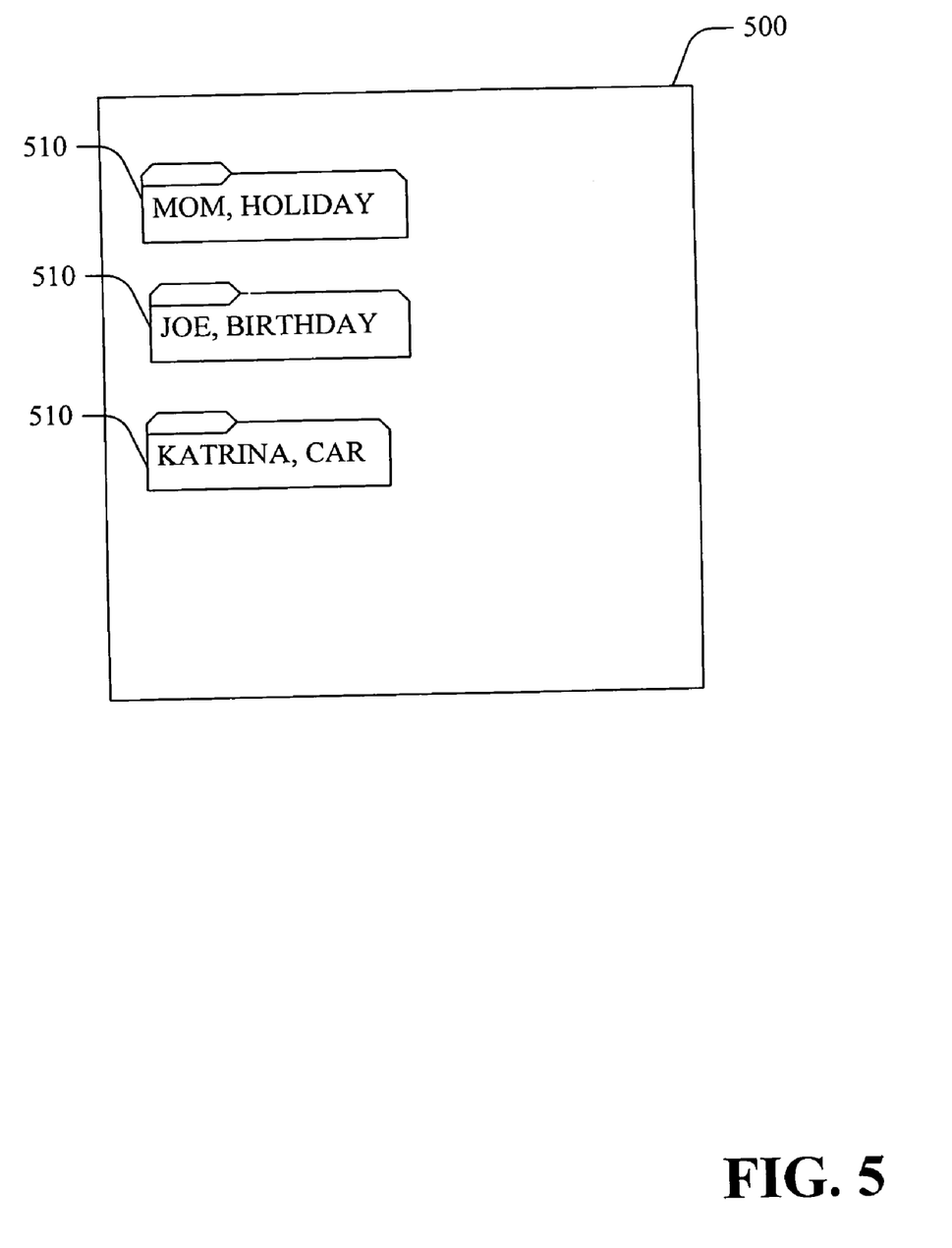
FIG. 5 is an exemplary user interface.

Next, turning to FIG. 5, an exemplary user interface 500 is illustrated. In this example, the keyphrase extraction system 100 was employed to automatically summarize a collection of email communications. The keyphrase extracted by the system 100 were employed to label groups of emails 510.

Figure 6:
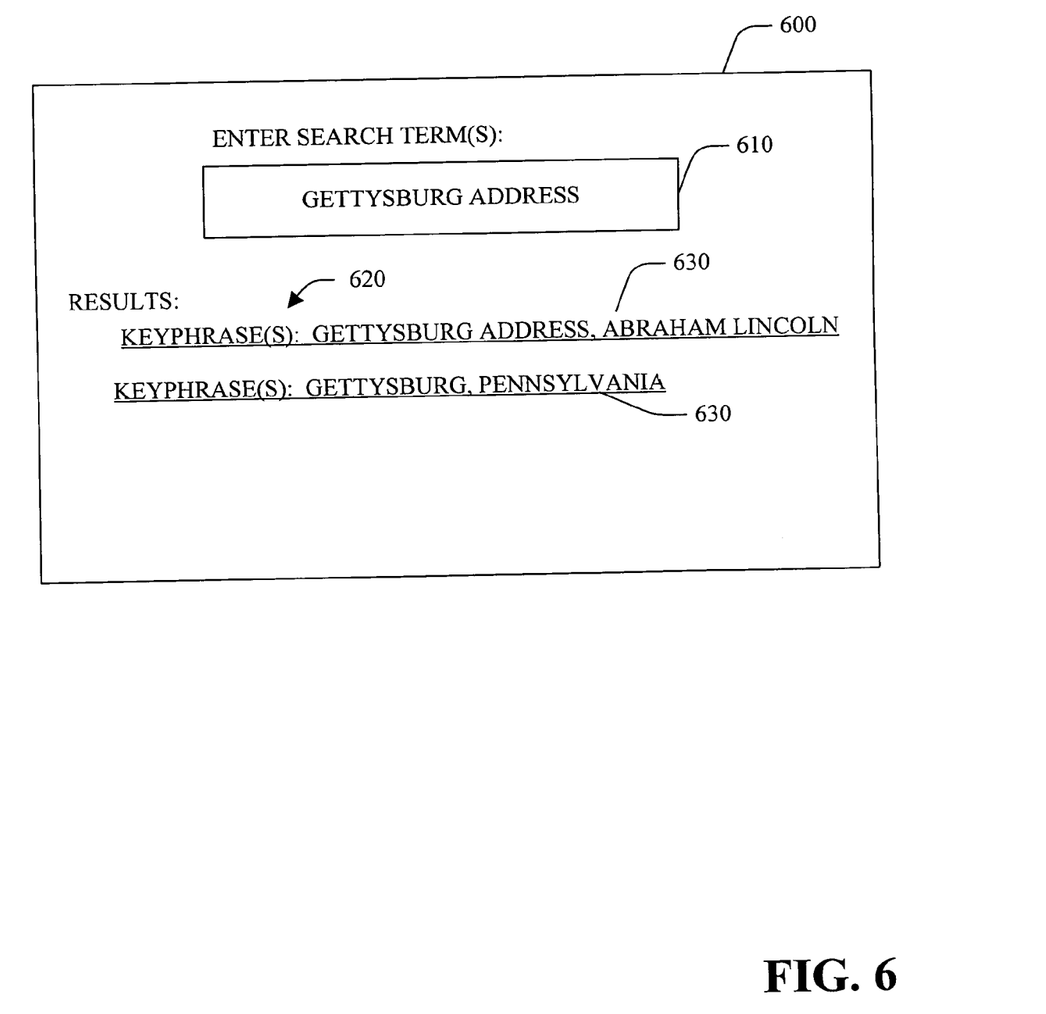
FIG. 6 is an exemplary user interface.

Referring to FIG. 6, an exemplary user interface 600 is illustrated. The user interface 600 can be employed to facilitate searching, for example, of the Internet. Search terms are entered into a search term field 610. Results are displayed in a result field 620. In this example, the search terms are compared with keyphrases produced by the keyphrase extraction system 100 for various collections of Internet pages. In one example, keyphrases are produced by the extraction system 100 in an offline fashion, for example, to build an index of keyphrases for various collections of Internet pages. Additionally, the user interface 600 can facilitate navigation to a particular collection of Internet pages, for example, by selecting a particular keyphrase field 630.

It is to be appreciated that the system 100, the term identifier 110, the probability computation component 120, the partial mutual information computation component 130, the summarization component 140, the document-term matrix, the system 300, the document collection 310 and/or the user interface component 320 can be computer components as that term is defined herein.

Figure 7:
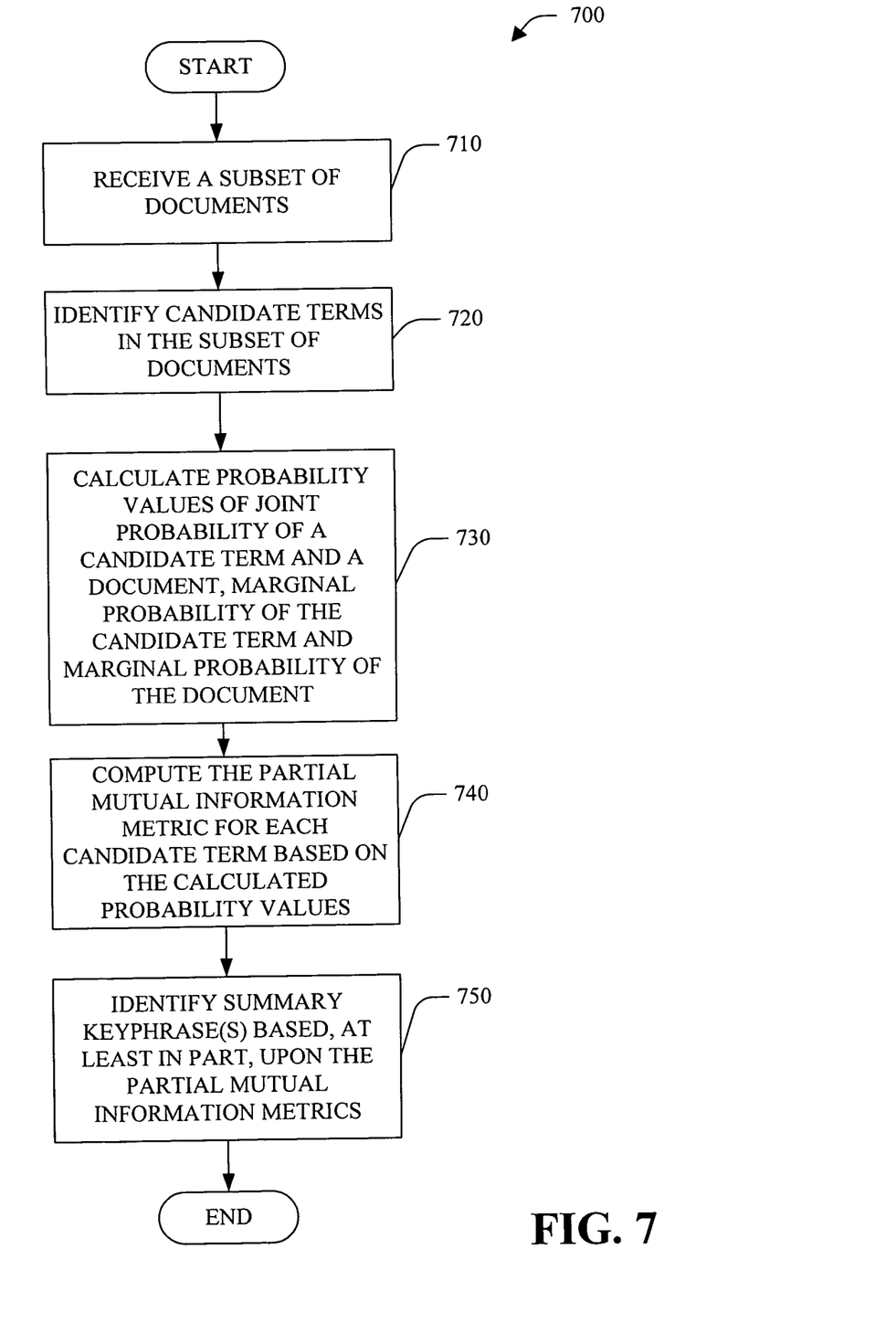
FIG. 7 is a flow chart of a method of summarizing a subset of documents.

Turning briefly to FIG. 7, a methodology that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodology.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 7, a method of summarizing a subset of documents 700 is illustrated. At 710, a subset of documents is received (e.g., selection by a human and/or by an automatic clustering algorithm). At 720, candidate terms (e.g., words and/or phrases) are identified in the subset of documents. For example, a noun phrase detector and/or phrase detection technique(s) can be employed to identify the candidate terms.

Next, at 730, probability values of (1) the joint probability of a candidate term and a document, the marginal probability of the candidate term and the marginal probability of the document are calculated. For example, as discussed above, in one example, in order to calculate these probabilities, a document-term matrix is formed. The document-term matrix is based on the identified candidate terms and the document subset. For example, row(s) of the matrix can correspond to candidate terms and column(s) of the matrix can correspond to documents of the subset.

Thereafter, in this example, marginal counts are computed. For example, for each candidate term, a first marginal count can be computed of the number of times the particular candidate term occurs (e.g., in the entire document collection) (e.g., based on equation (1) above). A second marginal count can be computed of the number of terms (m) per document (e.g., for each document in the entire document collection), for example, based on equation (2) above. Additionally, a third marginal count can be computed of the total number of terms in the document collection (N), for example, based on equation (3) above. Optionally, these marginal counts can be computed simultaneously with forming the document-term matrix. Additionally, terms that appear in substantially all documents can be, optionally, given reduced weight and/or ignored for purposes of keyphrase extraction (e.g., copyright notice appearing on articles, v-card include with email communications etc.) Further, optionally, one or more of these counts can be smoothed and/or appropriately weighted, as discussed above.

Next, at 740, a partial mutual information metric is computed for each candidate term based on the calculated probability values, for example, by summing a formula over the documents in the set S. In general, for each word that occurs in the set S, the following is computed: (sum over all documents in selected set) joint probability of finding the word and document together x log (a ratio between two numbers). The ratio is between (1) the joint probability of the word and the document and (2) the product of the marginal probability of the word and the marginal probability of the document. In this example, the values of the document-term matrix are only accessed for documents in the subset S. For example, the partial mutual information metric can be based on equation (4) above. Optionally, smoothing and/or weighting can be performed before and/or after the partial mutual information metrics are computed, as discussed previously.

At 750, summary key phrase(s) are identified based, at least in part, upon the partial mutual information metrics. For example, the top K terms (e.g., for some K chosen by a user) can become the summary keyphrases. Additionally, if a keyphrase in the top K has a word that is also in the top K, it may be optionally dropped and the $K+1^{th}$ term may be used. Also, K may be chosen so that all terms with partial mutual information that is some fraction of the largest are shown (e.g., 0.5 of the largest).

Figure 8:
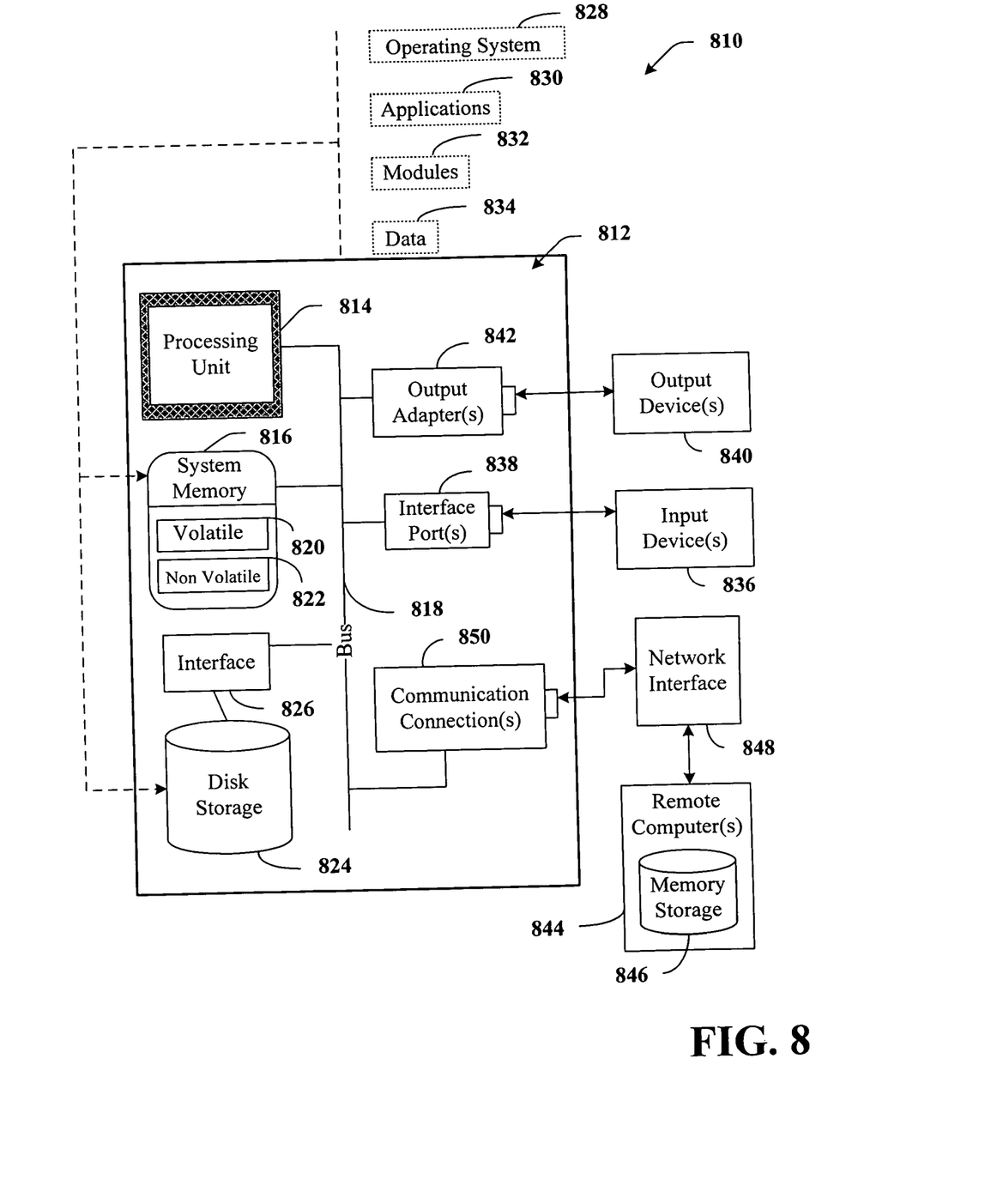
FIG. 8 illustrates an example operating environment.

In order to provide additional context for various aspects of the claimed subject matter, FIG. 8 and the following discussion are intended to provide a brief, general description of a suitable operating environment 810. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A keyphrase extraction system, comprising:
   a processor;
   a term identifier that employs a noun phrase detector to identify candidate terms in a subset of documents;
   a probability computation component that calculates respective probability values of a joint probability of a candidate term and a document in the subset of documents associated with a collection of documents, a marginal probability of the candidate term, and a marginal probability of the document, related to each candidate term, the probability computation component further employing an inverse document frequency so that candidate terms that appear in substantially all documents of the subset of documents are given reduced weight by the system, wherein the subset of documents comprises at least two documents and contains less documents than the collection of documents, and further includes documents respectively associated with at least two different disparate domains, the at least two different disparate domains containing at least two of a directory domain containing word processing documents, an e-mail domain containing e-mails, and a web page domain containing web pages;
   a partial mutual information metric computation component that computes a respective partial mutual information metric for each candidate term as a function of a ratio of the probability value of the joint probability of the candidate term and the document to a product of the probability value of the marginal probability of the candidate term and the probability value of the marginal probability of the document, wherein a document-term matrix based at least in part on candidate terms and the subset of documents is employed to facilitate determination of the joint probability of the candidate term and the document; and a summarization component that identifies one or more summary keyphrases associated with the subset of documents based at least in part upon the respective partial mutual information metric for each candidate term, wherein a top quantity of candidate terms is identified as the summary keyphrases and the summarization component excludes a particular word from the identified summary keyphrases when a particular keyphrase in the top quantity of candidate terms and the top quantity of candidate terms both include the particular word.

2. The system of claim 1, wherein to identify candidate terms, a term identifier employs a phrase detection technique to identify as a string one or more words between two stop words.

3. The system of claim 1, further comprising a frequency count employed to eliminate at least one of words or phrases that occur below a particular threshold in the subset of documents.

4. The system of claim 1, wherein the probability computation component further comprises:
a document-term matrix formation component that forms the document-term matrix based at least in part on identified candidate terms and the subset of documents; and
a marginal count component that computes marginal counts of the document-term matrix, the marginal counts provided as probability values by the probability computation component.

5. The system of claim 4, wherein for each candidate term, the marginal count component computes the number of times the particular candidate term occurs in the subset of documents.

6. The system of claim 4, wherein for each document in the subset of documents, the marginal count component computes the number of candidate terms per document.

7. The system of claim 4, wherein the marginal count component computes a total number of candidate terms in the subset of documents.

8. The system of claim 4, wherein the marginal counts are computed simultaneously with formation of the document-term matrix.

9. The system of claim 4, wherein for each candidate term, the partial mutual information metric is computed using:

$$I_i = \sum_{j \in S} \frac{n_{i,j}}{N} \log \frac{n_{i,j}/n_i}{m_j/N}$$

wherein,
$I_i$ is the partial mutual information metric for a particular candidate term;
j is an index of the subset of documents;
S is the subset of documents;
$n_{i,j}$ is an element of the matrix and a number of times a candidate term i appears in document j;
N is a total number of candidate terms in the subset of documents; and,
$m_j$ is a number of candidate terms that appear in document j, for each document in the subset of documents.

10. The system of claim 1, wherein the top quantity of candidate terms is based at least in part upon information from a user.

11. The system of claim 1, wherein the subset of documents is based at least in part upon an automatic clustering algorithm.

12. The system of claim 1, wherein the subset of documents is based at least in part upon information received from a user.

13. A method that facilitates summarizing a subset of documents, comprising:
identifying candidate terms in the subset of documents associated with a collection of documents, wherein the subset of documents comprises at least two documents, contains a smaller number of documents than the collection of documents, and includes documents respectively associated with at least two different domains, the at least two different domains are at least two of a directory domain containing word processing documents, an e-mail domain containing e-mails, or a web page domain containing web pages;
for each candidate term, calculating respective probability values of a joint probability of a candidate term and a document in the subset of documents, a marginal probability of the candidate term, and a marginal probability of the document in the subset of documents;
employing an inverse document frequency so that candidate terms that appear in substantially all documents of the subset of documents are given reduced weight;
computing a partial mutual information metric for each of the candidate terms based at least in part on a ratio of the probability value of the joint probability of the candidate term and the document to a product of the probability value of the marginal probability of the candidate term and the probability value of the marginal probability of the document, wherein a document-term matrix based at least in part on candidate terms and the subset of documents is utilized to facilitate computing the joint probability of the candidate term and the document for each candidate term;
identifying one or more summary keyphrases based at least in part upon the computed partial mutual information metrics;
identifying a top quantity of candidate terms as the one or more summary keyphrases;
excluding a particular word from the identified summary keyphrases when a particular keyphrase in the top quantity of candidate terms and the top quantity of candidate terms both include the particular word; and
providing the one or more summary keyphrases to facilitate summarizing the subset of documents.

14. The method of claim 13, wherein the partial mutual information metric for each of the candidate terms is computed using:

$$I_i = \sum_{j \in S} \frac{n_{i,j}}{N} \log \frac{n_{i,j}/n_i}{m_j/N}$$

wherein,
$I_i$ is the partial mutual information metric for a particular candidate term;
j is an index of the subset of documents;
S is the subset of documents;

$n_{i,j}$ is an element of the matrix and a number of times a candidate term i appears in document j;

N is a total number of candidate terms in the subset of documents; and $m_j$ is a number of candidate terms that appear in document j, for each document in the subset of documents.

* * * * *